United States Patent
Barrere-Tricca et al.

(10) Patent No.: US 6,596,253 B1
(45) Date of Patent: Jul. 22, 2003

(54) REGENERATION OF A DESULFURIZING CATALYTIC SOLUTION BY MEANS OF AN EJECTOR

(75) Inventors: Cécile Barrere-Tricca, Paris (FR); Christian Streicher, Rueil Malmaison (FR); Jean-Charles Viltard, Vienne (FR)

(73) Assignee: Institut Francais du Petrole, Rueil-Malmaison Cedex (FR)

( * ) Notice: Subject to any disclaimer, the term of this patent is extended or adjusted under 35 U.S.C. 154(b) by 0 days.

(21) Appl. No.: 09/592,425

(22) Filed: Jun. 12, 2000

(30) Foreign Application Priority Data

Jun. 10, 1999 (FR) .............................................. 99 07360

(51) Int. Cl.⁷ .............................................. C01B 17/04

(52) U.S. Cl. ................. 423/573.1; 423/576.2; 423/576.4; 423/576.5; 423/576.6; 423/576.7

(58) Field of Search ............................. 423/573.1, 576.2, 423/576.4, 576.5, 576.6, 576.7

(56) References Cited

U.S. PATENT DOCUMENTS

| | | | |
|---|---|---|---|
| 4,532,118 A | 7/1985 | Tajiri et al. | 423/226 |
| 4,859,436 A | 8/1989 | Olson et al. | 423/221 |
| 5,753,189 A | 5/1998 | Rehmat | 422/110 |
| 6,165,436 A | * 12/2000 | Dezael et al. | 423/576.4 |

FOREIGN PATENT DOCUMENTS

| | | | |
|---|---|---|---|
| DE | 3444252 A1 | 6/1985 | |
| WO | WO 92/17401 | * 10/1992 | .............. 423/576.6 |
| WO | WO 96/29289 | 9/1996 | |

OTHER PUBLICATIONS

Perry et al. (Editors) *Chemical Engineers' Handbook* (5th Ed.), McGraw–Hill Book Co. USA, ISBN 0–07–049478–9, pp. 18–74 and 18–75, (1973).*

Perry et al. *Chemical Engineers' Handbook* 5th Edition, McGraw–Hill Book Co. USA ; ISBN 0–07–049478–9, pp. 6–29 to 6–32, 1973.*

* cited by examiner

Primary Examiner—Steven Bos
Assistant Examiner—Timothy C Vanoy
(74) *Attorney, Agent, or Firm*—Millen White Zelano & Branigan

(57) ABSTRACT

In the desulfurization of a gaseous feed containing hydrogen sulfide, comprising contacting the gaseous feed with a catalytic solution containing a chelated polyvalent metal under suitable conditions for oxidation of the hydrogen sulfide to elementary sulfur and concomitant reduction of the chelated polyvalent metal from a higher oxidation level to a lower oxidation level, recovering a gaseous effluent substantially freed from hydrogen sulfide, and a catalytic solution at least partly reduced and containing elementary sulfur, separating the solid elementary sulfur from the reduced catalytic solution, and regenerating the reduced catalytic solution by contacting the catalytic solution with a gas containing oxygen by means of an ejector.

20 Claims, 4 Drawing Sheets

REGENERATION OF A DESULFURIZING CATALYTIC SOLUTION BY MEANS OF AN EJECTOR

FIELD OF THE INVENTION

The object of the present invention is a process for treating, by means of a catalytic solution, a gas under pressure containing at least hydrogen sulfide wherein the sulfur recovery stage can be carried out under high pressure and the catalytic solution is regenerated with an oxygen-containing gas, and a device allowing dispersion of this gas into fine droplets in the solution.

The process according to the invention is notably applied to air regeneration of the catalytic solution during a <<redox>> process for desulfurizing a gas containing at least hydrogen sulfide. This process uses a catalytic solution comprising at least one polyvalent metal chelated by at least one chelating agent under suitable conditions for oxidation of the hydrogen sulfide to elementary sulfur and simultaneous reduction of the chelated polyvalent metal from a higher oxidation level to a lower oxidation level. A gaseous effluent practically free of hydrogen sulfide is recovered on the one hand and a catalytic solution at least partly reduced and containing elementary sulfur is recovered on the other hand. The solid elementary sulfur is separated from the partly reduced catalytic solution. At least part of said partly reduced catalytic solution freed from most of the solid elementary sulfur can be at least partly expanded. Said solution, at least partly expanded, is air-regenerated by natural entrapment of air into a regeneration zone consisting of at least one ejector associated with at least one gas/liquid separator.

BACKGROUND OF THE INVENTION

The prior art describes many <<redox>> processes allowing to eliminate hydrogen sulfide. These processes however have several drawbacks.

In general, it is well-known to contact the partly reduced catalytic solution containing the solid elementary sulfur with air at atmospheric pressure in order to regenerate said solution and to recover the sulfur by flotation and/or decantation. When the gas to be desulfurized is under high pressure, preliminary expansion of the reduced catalytic solution containing the solid sulfur is therefore generally performed. This expansion leads to degassing of the reduced catalytic solution which generally causes foaming and clogging problems (due to the simultaneous presence of solid sulfur and dissolved gas) that can lead to plant stops.

The separation stage being in principle carried out after the expansion stage, the expansion stage thus involves all of the reduced catalytic solution. A large quantity of energy is therefore necessary to recompress all of the solution after the regeneration stage.

Air regeneration of the reduced catalytic solution is generally performed by air injection by means of a diffuser, at the bottom of a reactor containing said solution to be regenerated (air blower), as described for example in French patent application number 97/15,520 filed by the applicant. However, this procedure is not optimal. In fact, such a reactor is generally large in size in relation to the other apparatuses of the device because the regeneration rate of the catalytic solution is most often widely controlled by transfer of the oxygen of air to the liquid, therefore by the gas/liquid surface. Furthermore, air compressors can require a large amount of energy.

The prior art is furthermore described in patents U.S. Pat. No. 5,753,189, WO-96/29,289 A, DE-3,444,252 A, U.S. Pat. No. 4,859,436 and U.S. Pat. No. 4,532,118. However, none of these documents describes or suggests, alone or in combination, a process for desulfurizing a feed containing at least hydrogen sulfide wherein at least part of the reduced catalytic solution from stage b) of separation of the elementary sulfur from the reduced catalytic solution is expanded so as to degas the solution to be regenerated until a pressure allowing autonomous operation of the driving device intended for natural entrainment of air into the regenerator is reached. This device is an ejector.

SUMMARY OF THE INVENTION

The process according to the invention proposes a new approach for sulfur recovery and regeneration of the catalytic solution which notably affords the following advantages:

it prevents foaming and clogging problems due to the simultaneous presence of solid sulfur and dissolved gas in the reduced catalytic solution, it minimizes the energy consumption required for recompression of the regenerated catalytic solution, it minimizes the size of the catalytic solution regeneration zone and therefore reduces energy consumption in this zone.

The present invention relates to a process intended for desulfurization of a gaseous feed containing at least hydrogen sulfide, comprising at least the following stages:

a) contacting the gaseous feed consisting at least of hydrogen sulfide with a catalytic solution comprising at least one polyvalent metal chelated by at least one chelating agent, under suitable conditions for oxidation of the hydrogen sulfide to elementary sulfur and concomitant reduction of the chelated polyvalent metal from a higher oxidation level to a lower oxidation level (absorption stage), and recovering on the one hand a gaseous effluent substantially freed from hydrogen sulfide and, on the other hand, said catalytic solution at least partly reduced and containing elementary sulfur, b) separating the solid elementary sulfur from the reduced catalytic solution, c) regenerating the reduced catalytic solution in a regeneration zone, d) recycling at least part of the regenerated catalytic solution to a stage of contacting the regenerated solution with a gaseous feed consisting at least of hydrogen sulfide.

It is characterized in that at least part of the reduced catalytic solution freed from most of the elementary sulfur and coming from stage b) is expanded, the gases produced upon expansion are discharged and stage c) of regeneration of the expanded reduced catalytic solution is carried out by contacting the circulating catalytic solution with a gas containing oxygen by means of at least one ejector in said regeneration zone.

Regeneration stage c) is then carried out by contacting the circulating catalytic solution with a gas containing oxygen, under suitable conditions allowing dispersion of the gas into very fine bubbles in the catalytic solution by increasing the velocity of circulation of said solution.

The ejector can be used under such conditions that the ratio of regeneration gas to liquid advantageously ranges between 0.1 and 10, preferably between 0.5 and 5.

The gaseous feed can be at a pressure ranging between 0.1 and 22 MPa in relative pressure and preferably between 4 and 10 MPa.

Said reduced catalytic solution depleted in elementary sulfur, obtained after stage b), can be fractionated into a major fraction $F_1$ and a minor fraction $F_2$, and the non-expanded major fraction $F_1$ is recycled to absorption stage a).

The potential of said partly reduced catalytic solution is for example measured before the fractionation stage and fractions $F_1$ and $F_2$ are determined, the quantity of said fractions is controlled so as to maintain the ratio of the ferric ions to the ferrous ions substantially equal to 20.

Separation stage b) can be carried out at a pressure ranging between 0.1 and 20 MPa.

A gas/liquid separation stage is for example carried out after the catalytic solution regeneration stage in order to remove the excess gas in the regeneration zone.

An aqueous solution can be used as the catalytic solution in stage a).

The aqueous catalytic solution is for example a solution of a chelated polyvalent metal such as an aqueous solution of chelated iron produced for example from ferrous or ferric iron such as iron and ammonium or potassium sulfates, nitrates, thiosulfate, chloride, acetate, oxalate, phosphates, soluble salts such as ferrous iron and ammonium sulfate, ammonium ferric oxalate, potassium ferric oxalate.

Chelating agents are for example used alone or in admixture, such as organic compounds known for their complexing properties, for example acetylacetone, citric acid, salicylic acid, sulfosalicylic acid, tiron (catechodisulfonic acid), dimercapto-2-3 propanol and aminoacids such as EDTA (ethylenediamine tetraacetic acid), HEDTA (hydroxy2ethylenediamine triacetic acid), NTA (nitrilotriacetic acid), DCTA (diamino-1-2 cyclohexane tetraacetic acid), DPTA (diethylenetriamine pentaacetic acid), IDA (imonodiacetic acid).

The catalytic solution is for example an organic solution.

It is possible to use for example an organic solution consisting (i) of a solvent selected from the following products: N-methyl pyrrolidine, N-formylmorpholine, morpholine, dimethylsulfoxide, sulfolane, dimethylformamide, propylene carbonate, 1,4-dioxane, 4-hydroxy-4-methyl-2-pentanone, propylene glycol methyl ether, 2-butoxyethanol, 4-methyl-2-pentanone, 2,4-pentanedione, alone or in admixture, and (ii) of a chelated polyvalent metal of formula $ML_3$ where L is of $R_1COCH_2COR_2$ form with $R_1$ and $R_2$ selected from groups $CH_3$, $C_2H_5$, $C_6H_5CF_3$, $C_4H_3S$, and M is a polyvalent existing in at least two oxidation states.

According to a variant, the sulfur coming from separation stage b) is washed with water in order to recover the catalytic solution.

The invention also relates to a device intended for desulfurization of a gaseous feed containing at least hydrogen sulfide, said device comprising at least one zone for contacting said gaseous feed with a catalytic solution containing at least one polyvalent metal chelated by at least one chelating agent, under suitable conditions for oxidation of the hydrogen sulfide to elementary sulfur and concomitant reduction of the chelated polyvalent metal from a higher oxidation level to a lower oxidation level, a device intended for separation of the solid elementary sulfur from said reduced catalytic solution, a regeneration zone for said reduced catalytic solution, said regeneration zone comprising suction means intended for a regeneration gas containing oxygen.

It is characterized in that it comprises at least one means (11) intended for expansion of said solution, located after separation device (2), a means intended for separation of the gases produced and at least one ejector (16) arranged in the regeneration zone, suited to obtain dispersion of the regeneration gas into very fine bubbles in said solution.

The ejector can be connected to a gas/liquid separation device.

The contacting zone comprises for example at least one contactor/reactor selected from the following list: reactor with stacked or random packing, static mixer, turbulent-jet impactor, hydro-ejector, atomizer, wire contactor, bubble column.

The process and the device can be applied to desulfurization of a natural gas.

BRIEF DESCRIPTION OF THE DRAWINGS

Other features and advantages of the invention will be clear from reading the description hereafter of embodiments given by way of non limitative example, with reference to the accompanying figures wherein FIG. 1 diagrammatically shows an arrangement of apparatuses required for implementing the process according to the invention, FIG. 2 diagrammatically shows a variant of the process of FIG. 1 where part of the catalytic solution is recycled to the absorption zone prior to expansion, FIG. 3 diagrammatically shows a variant of the process of FIG. 1 where the gas to be processed is at low pressure, FIG. 4 diagrammatically shows a variant of the process of FIG. 1 where the gas to be processed is contacted with the catalytic solution cocurrent thereto, and FIG. 5 diagrammatically shows a variant of the process of FIG. 1 where the sulfur produced, imbibed with catalytic solution, is washed with water, then the diluted catalytic solution is treated so as to reconcentrate said catalytic solution and possibly to eliminate ions.

DETAILED DESCRIPTION

In order to illustrate the stages of the process according to the invention, the descriptions of the figures and the examples hereafter are given for processes intended for desulfurization of a gas containing at least hydrogen sulfide, wherein a catalytic solution containing at least one polyvalent metal chelated by at least one chelating agent, for example a chelated iron solution, is used in order to perform oxidation of the hydrogen sulfide to elementary sulfur and concomitant reduction of the chelated polyvalent metal from a higher oxidation level to a lower oxidation level. A gaseous effluent depleted in hydrogen sulfide is recovered on the one hand and the catalytic solution at least partly reduced and containing elementary sulfur is recovered on the other hand.

The desulfurization process can comprise the following two oxidation reduction stages:

in a first stage (absorption stage), the hydrogen sulfide present in the gas to be processed reacts with chelated ferric ions according to the relation:

$$H_2S+2\ Fe^{3+}(chel) \rightarrow S+2\ H^{+}+2\ Fe^{2+}(chel) \qquad (1)$$

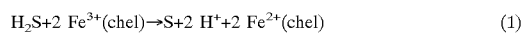

in a second stage (regeneration stage), the ferrous ions obtained are reoxidized by the oxygen of air according to the reaction:

$$2\ Fe^{2+}(chel)+2\ H^{+}+\tfrac{1}{2}\ O_2 \rightarrow 2\ Fe^{3+}(chel)+H_2O \qquad (2).$$

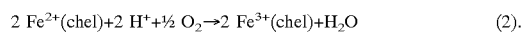

Figure 1:
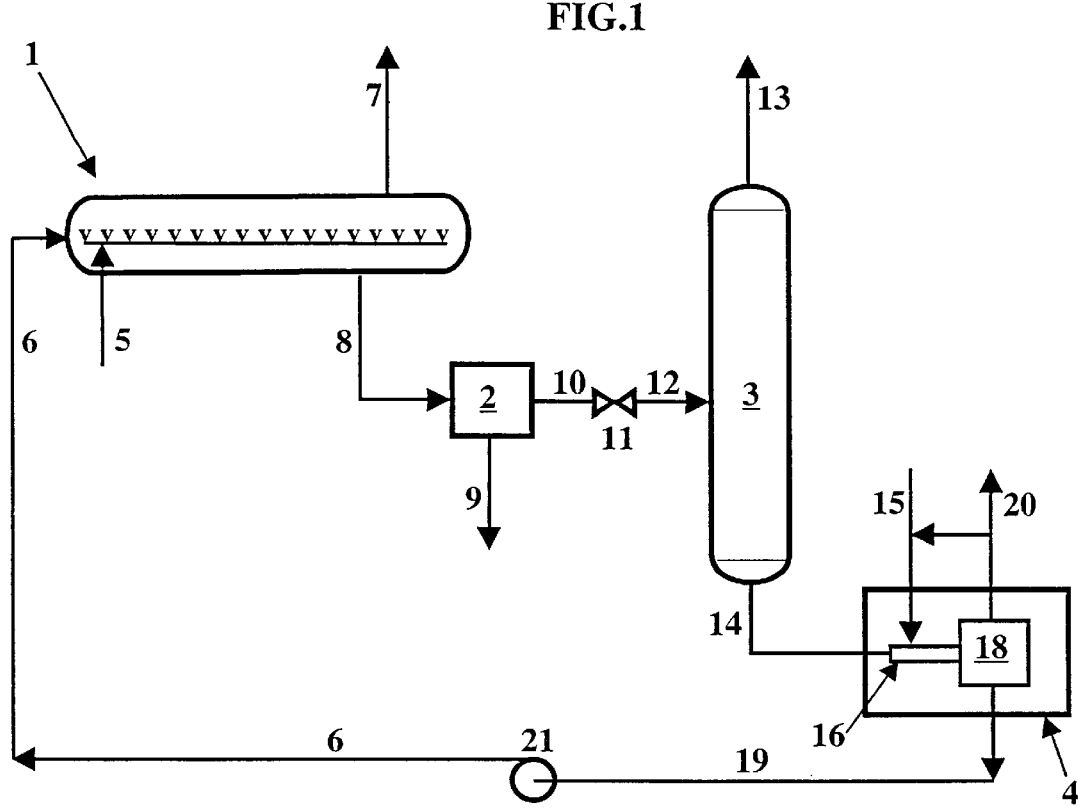

The device for implementing the process according to the invention, a variant of which is described in FIG. 1, allows to process gas at high pressure. It comprises an enclosure 1 for contacting the gas to be processed with the catalytic solution, wherein oxidation reduction reaction (1) takes place, a device 2 intended for separation of the solid elementary sulfur produced, an expansion device such as an expansion valve 11 followed by a flash zone 3 comprising a flash drum for example, and an enclosure 4 intended for air regeneration of the catalytic solution.

Contacting enclosure or absorber 1 is equipped with a line 5 intended for delivery of the gas to be processed, containing at least hydrogen sulfide, a line 6 intended for delivery of the catalytic solution, a line 7 intended for discharge of the gas freed from at least most of the hydrogen sulfide and a line 8 intended for discharge of the partly reduced catalytic solution containing elementary sulfur produced during oxidation reduction reaction (1).

Line 8 is connected to separation device 2 which can consist of a filter suited for <<solid elementary sulfur/catalytic solution>> separation at high pressure, for example above 0.5 MPa. At the outlet of separation device 2, the solid elementary sulfur is discharged through a line 9 while the partly reduced catalytic solution freed from most of the solid elementary sulfur is sent through a line 10 to expansion valve 11. This expansion causes degassing of the most part of the products dissolved at high pressure in said partly reduced catalytic solution (light hydrocarbons, $CO_2$, sulfur-containing organic products). The gases recovered can be used as fuel gas, which allows on the one hand to prevent atmospheric pollution and, on the other hand, to upgrade them. Partial expansion is performed to a pressure allowing autonomous operation of the natural air entrainment device (ejector), for example to a relative pressure of 0.05 to 0.9 MPa, preferably 0.1 to 0.5 MPa. A mixture consisting of the partly reduced and partly expanded catalytic solution and products obtained from degassing are recovered at the outlet of the expansion valve.

This mixture is fed through a line 12 into flash drum 3. Products obtained from degassing are recovered through a line 13 at the top of flash drum 3 and the partly reduced and partly degassed catalytic solution is recovered through a line 14 at the bottom of flash drum 3. The partly reduced and partly degassed catalytic solution can then be contacted with a gas containing oxygen and allowing regeneration of the solution without risks of explosion due to the simultaneous presence of oxygen and of hydrocarbon. The regeneration gas is air for example.

The reduced and degassed catalytic solution is sent to air regeneration zone 4 through line 14.

This zone comprises for example at least one device 16 suited for dispersion of the air into fine bubbles in the catalytic solution to be regenerated. This device is for example an ejector 16 associated with a gas-liquid separator 18. This zone 4 is also provided with an air suction line 15 allowing regeneration of the catalytic solution, a line 20 intended for discharge of the excess air that has not reacted and a line 19 intended for discharge of the regenerated catalytic solution. The regenerated catalytic solution discharged through line 19 is then recompressed by a pump 21 to a pressure substantially equal to that of the absorber and recycled through line 6 to contacting enclosure 1. The shape of ejector 16 is selected to obtain an increase in the velocity of circulation of the catalytic solution to be regenerated. It comprises for example a circulation passage with a reduced section of flow so as to increase the velocity of circulation from a value $u_1$ to a value $u_2$. This leads to a decrease in the pressure of the catalytic solution from an initial value $P_1$ to a value $P_2$ and generates high shear stresses leading to suction through line 15 and to dispersion of the air into very fine bubbles.

The gas-liquid contact surface is very large, which allows very fast transfer of the oxygen contained in the air to the catalytic solution. A turbulent two-phase jet containing finely dispersed gas bubbles is obtained at the outlet of the ejector.

The catalytic solution is fed into ejector 16 at a pressure value $P_1$ higher than the atmospheric pressure, preferably at least equal to a relative pressure of 0.3 MPa.

Ejector 16 can be a hydro-ejector marketed by the Biotrade company. Such a device, allowing air regeneration of the catalytic solution and using an ejector, notably affords the following advantages: investment, size and energy gains.

Contacting enclosure (1) comprises for example at least one contactor/reactor selected from the following list: reactor with stacked or random packing, static mixer, turbulent-jet impactor, hydro-ejector, atomizer, wire contactor, bubble column.

In relation to the prior art, separation of the solid elementary sulfur under high pressure according to the process of the invention allows to prevent foaming and clogging problems due to the simultaneous presence of solid sulfur and dissolved gas in the reduced catalytic solution.

The separation stage is for example carried out by means of a high-pressure filter as described in patent U.S. Pat. No. 5,435,911. The device suited for sulfur separation comprises for example filter cartridges on which the solid elementary sulfur particles settle. The filter cartridges are for example combined in form of several filtering registers working alternately. After settling, the sulfur is recovered by scaling of the cartridges by means of a liquid (wet scaling) or gaseous (dry scaling) countercurrent. Scaling of the cartridges of a register can be controlled when the thickness of the cakes formed is such that the pressure difference on the filtering cartridges becomes high, for example between 0.1 and 0.4 MPa. During the scaling operation, the register concerned does not fulfil the function of a filter and the solution continues being filtered on the other registers. The sulfur is recovered in form of a cake or of a slurry. The filtering device is selected for operation at a pressure value ranging between 0.1 and 20 MPa.

The solid sulfur is advantageously separated from the partly reduced catalytic solution before regeneration of said solution by means of an ejector. This allows to take advantage of the formation of very fine gas bubbles without any foaming problem.

Figure 2:
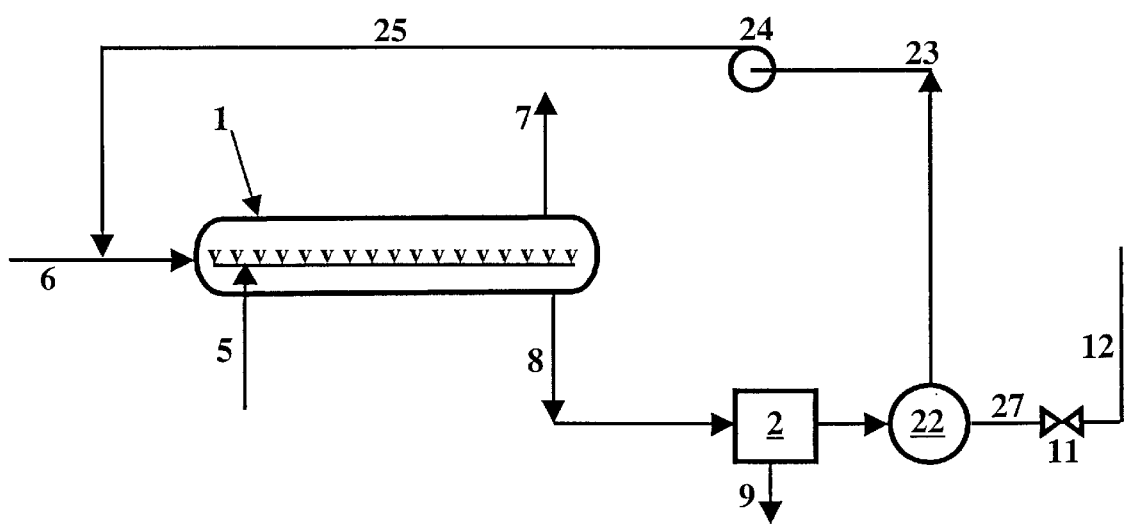

FIG. 2 diagrammatically shows an implementation variant of the process.

It is particularly well-suited when the catalytic solution is weakly reduced after oxidation reduction stage (1). It is notably applied when the ratio of the flow rate of the ferric ions present in the catalytic solution to the flow rate of the hydrogen sulfide is relatively high and at least above 10.

In relation to the example of FIG. 1, this embodiment comprises a device 22 allowing to fractionate the reduced catalytic solution depleted in solid elementary sulfur, coming from separation device 2, into a major fraction $F_1$ and a minor fraction $F_2$. Device 22 is arranged after separation device 2.

The non-expanded major fraction $F_1$ is sent through a line 23, a pump 24 and a line to the inlet of absorber 1. This fraction is mixed with the regenerated catalytic solution coming from line 6.

Minor fraction $F_2$ passes through line 27, it is expanded through valve 11 and sent to flash drum 3, then to regeneration zone 4.

Means for measuring the potential of the reduced catalytic solution and means for controlling the proportions of fractions $F_1$ and $F_2$ so as to maintain the $Fe^{3+}/Fe^{2+}$ ratio at a given value can be arranged in the vicinity of fractionation device 22.

Such a procedure advantageously allows to expand a fraction of the regenerated catalytic solution and thus to minimize the required recompression energy provided by recycling pump 21.

Figure 3:
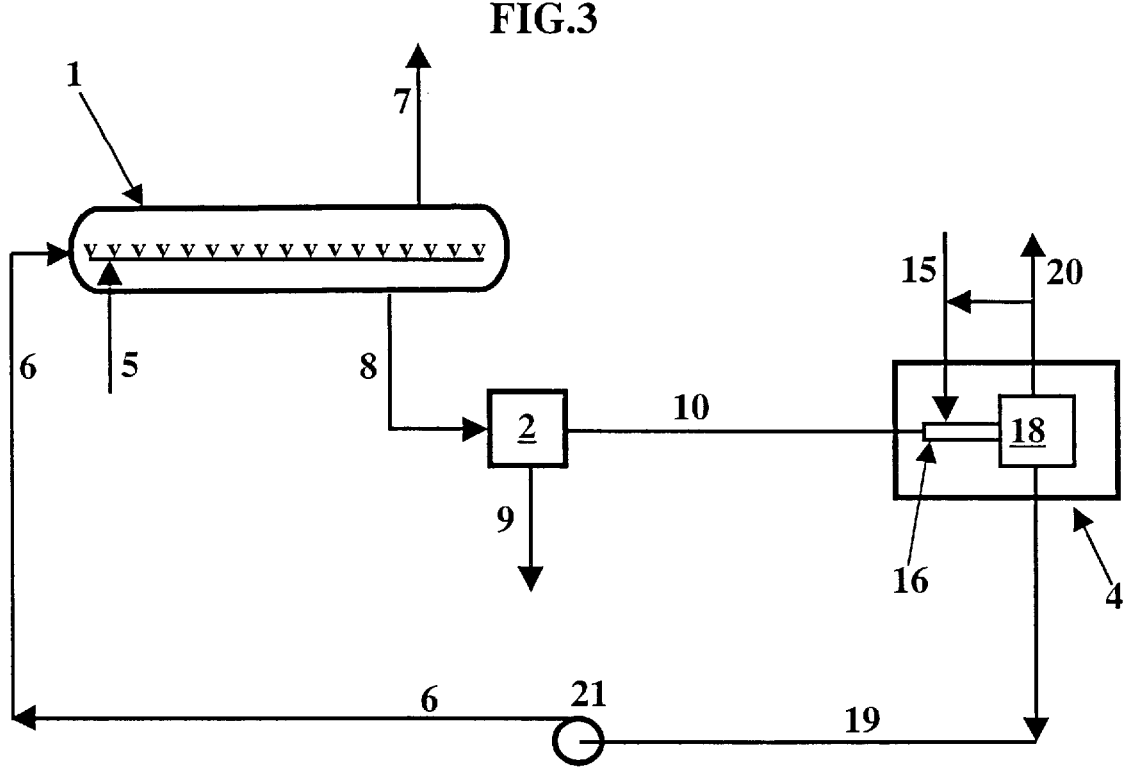

FIG. 3 diagrammatically shows a variant of the process described in FIG. 1 where the gas to be processed is at a pressure ranging for example between 0.1 and 1 MPa, preferably between 0.4 and 0.5 MPa.

In this case, the partly reduced catalytic solution freed from most of the solid elementary sulfur is directly sent through a line 10 to regeneration zone 4. Expansion valve 11 and flash drum 3 are not necessary in this case. Without departing from the scope of the invention, it is possible, as in FIG. 2, to use a fractionation device 22 after separation device 2. The major fraction $F_1$ and the minor fraction $F_2$ obtained are then processed as described in FIG. 2.

Figure 4:
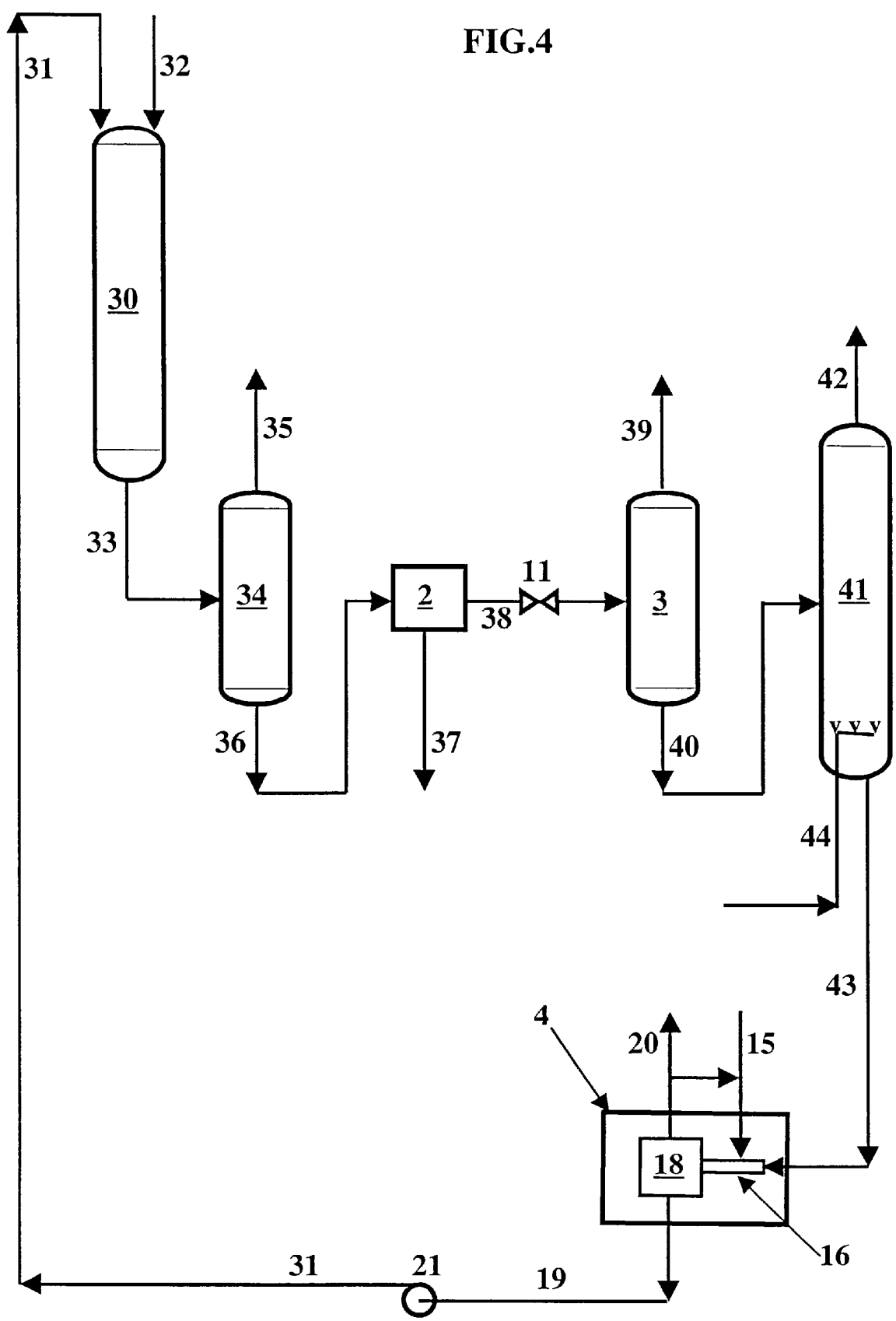

FIG. 4 diagrammatically shows a variant of the process according to the invention where the absorption stage (oxidation reduction according to (1)) is carried out by cocurrent circulation of the gas to be processed and of the catalytic solution.

It is performed downwards when the reactor is in a vertical position. Other types of contactors can be used without departing from the scope of the invention, in various positions, horizontal, vertical, with ascending or descending cocurrent or countercurrent fluid circulations.

Absorption zone or enclosure 1 (FIG. 1) therefore comprises a column 30 suited for cocurrent operation. Column 30 is provided, in the upper part thereof, with at least one line 31 allowing introduction of the catalytic solution, at least one line 32 intended for delivery of the gas to be processed, and in the lower part thereof with a line 33 intended for discharge of a mixture consisting of the gas practically free from hydrogen sulfide, the catalytic solution at least partly reduced and elementary sulfur produced during oxidation reduction reaction (1). The mixture can be an emulsion.

Line 33 is connected to a separation drum 34 at the outlet of which the cleaned gas is discharged at the top through a line 35 and a mixture consisting of the reduced catalytic solution and solid elementary sulfur is discharged at the bottom through a line 36.

This mixture is sent to separation device 2 at the outlet of which the sulfur is discharged through a line 37 while the reduced catalytic solution is sent through a line 38 to the expansion stage through valve 11. The reduced and expanded catalytic solution is fed into flash drum 3 allowing discharge of the gases produced upon expansion at the top of the flash drum through a line 39. The reduced and expanded catalytic solution can be sent through a line 40 to a complementary stripping stage, line 40 opening preferably onto the upper part of a stripping column 41.

Stripping column 41 comprises, in the lower part thereof for example, a line 44 allowing introduction of a stripping gas such as air or processed gas.

The stripping gas is discharged at the top of the stripping column, through a line 42, with the gases dissolved in the catalytic solution, such as $CH_4$, $C_2H_6$ . . . hydrocarbons, BTX, $CO_2$, the sulfur-containing organic molecules, and the reduced and stripped catalytic solution is discharged at the bottom of the stripping column through a line 43.

This reduced catalytic solution is then sent to air regeneration zone 4. It is fed into ejector 16 through line 43 and the air is naturally sucked in through line 15. The ejector is for example followed by a gas-liquid separation drum 18. The excess air that has not been used during the oxidation reduction reaction according to equation (2) is discharged from gas-liquid separation drum 18 through a line 20 which recycles it, at least partly, to line 15, which avoids pollutant emission to the atmosphere. The air-regenerated catalytic solution is discharged from the gas-liquid separation drum through a line 19 and replaced under a pressure substantially equal to that of absorber 30 by a pump 21, then it is recycled through line 31 to the top of absorber 30.

This procedure advantageously allows to increase the amount of dissolved gas recovered. The gases coming from lines 39 and 42 can be combined and sent to be used as fuel gas.

Figure 5:
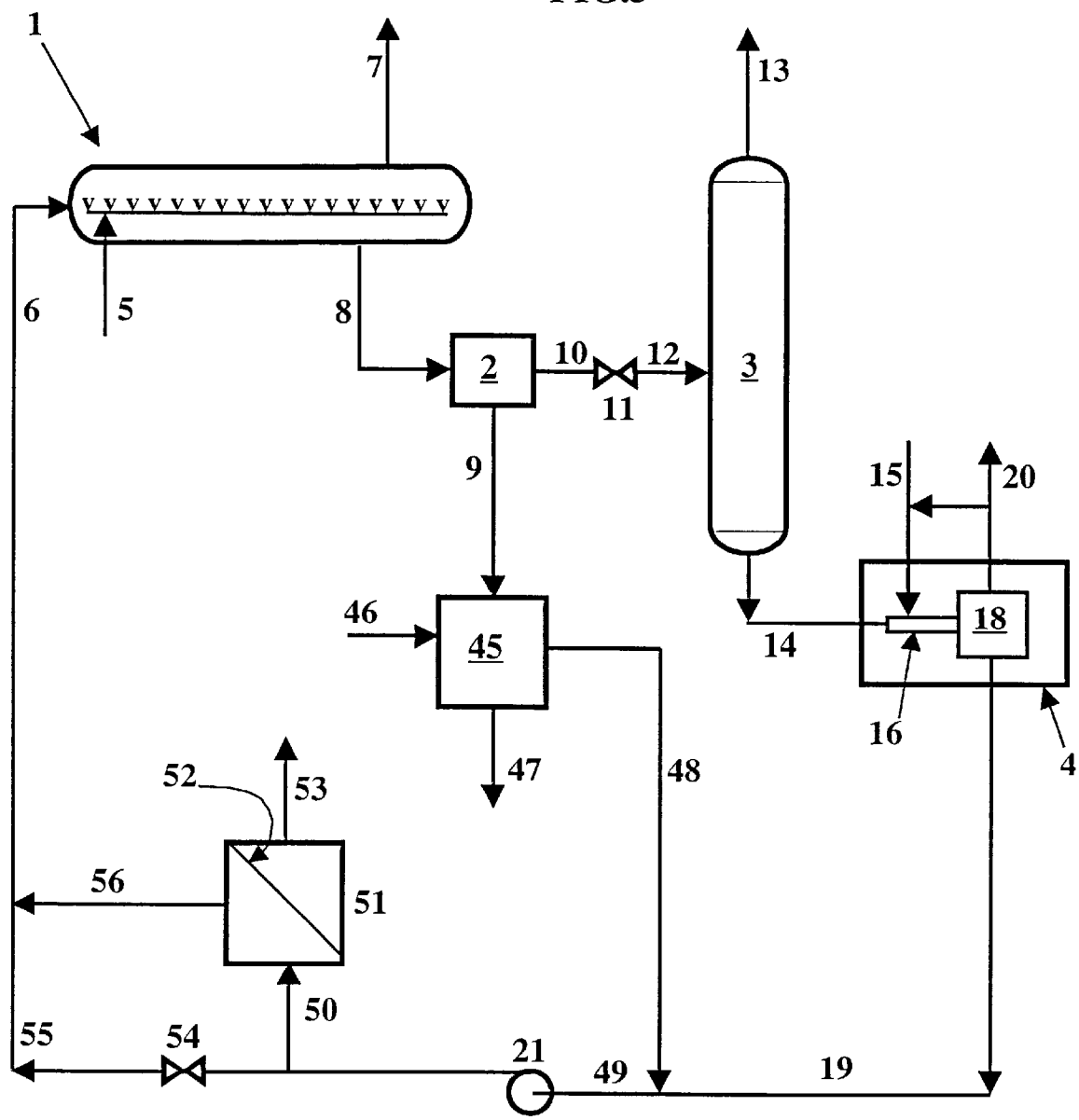

FIG. 5 diagrammatically shows a variant of the process described in FIG. 1 wherein the sulfur produced after separation is washed with water, then the diluted catalytic solution is processed by reverse osmosis or nanofiltration.

After the separation stage, the sulfur produced is still imbibed with a large quantity of partly reduced catalytic solution (of the order of 20 to 50%). If the gas to be processed is concentrated in hydrogen sulfide, a large quantity of sulfur can be produced and therefore leads to great catalytic solution losses. Furthermore, the catalytic solution contains ions of low molecular weight resulting from side reactions.

In order to limit catalytic solution losses with the sulfur produced, the latter is sent through a line 9 to a washing stage consisting for example of an equipment 45 intended for water washing of the sulfur and separation of the washed sulfuir and of the diluted catalytic solution obtained after washing, a water inlet 46, a line 47 intended for discharge of the sulfur freed from at least part of the catalytic solution that imbibed it and a line 48 intended for discharge of the diluted catalytic solution. Said diluted catalytic solution is sent through line 48 to line 6. The mixture coming from lines 6 and 48 is sent through line 49 to high-pressure pump 21 which recompresses the catalytic solution to a pressure substantially equal to the pressure of the absorber. At least part of this recompressed catalytic solution can be sent through a line 50 to a treating device 51 using reverse osmosis or nanofiltration and consisting of at least one membrane 52. Said membrane 52 is selected to allow passage of only water molecules (reverse osmosis) or of water molecules and ions of low molecular weight resulting from side reactions (nanofiltration). The membrane does not allow passage of the catalyst (polyvalent metal chelated by at least one chelating agent). Part of the water and possibly part of the ions from side reactions are discharged through a line 53 and the reconcentrated catalytic solution possibly freed from part of said ions is sent back through a line 56 and line 6 to the absorption stage. A bypass line 55 allows, by means of a valve 54 for example, to adjust the fraction of diluted catalytic solution treated by reverse osmosis or nanofiltration.

The driving force of a reverse osmosis or nanofiltration separation being the pressure, a pump is generally placed before the membrane in order to compress the solution to be processed. Advantageously, according to the process of the invention, the catalytic solution being under pressure, it is useless to add a pump, which saves energy and investment.

Another advantage of this device is the fact that the presence of a reverse osmosis or nanofiltration stage allows to eliminate the excess water likely to accumulate in the plant and thus to control the catalyst content of the catalytic solution. Water appearances other than those due to washing of the sulfur, such as water formation by chemical reaction in the absorber or water of condensation, can thus be discharged by reverse osmosis or nanofiltration.

The device intended for sulfur washing and reverse osmosis or nanofiltration separation can also be used in other processes or with other equipments, for example with the devices diagrammatically shown in FIG. 2 or in FIG. 4.

Without departing from the scope of the invention, the process according to the invention can also be applied in other processes or with other equipments.

The catalytic solution used is for example an aqueous solution of a chelated polyvalent metal, for example an aqueous solution of chelated iron produced for example from ferrous or ferric iron such as iron and ammonium or potassium sulfates, nitrates, thiosulfate, chloride, acetate, oxalate, phosphates, soluble salts such as ferrous iron and potassium sulfate, ferric ammonium oxalate, ferric potassium oxalate, etc. Chelating agents can be used alone or in admixture, such as organic compounds known for their complexing properties, for example acetylacetone, citric acid, salicylic acid, sulfosalicylic acid, tiron (catechodisulfonic acid), dimercapto-2-3 propanol and aminoacids such as EDTA (ethylenediamine tetraacetic acid), HEDTA (hydroxy2ethylenediamine triacetic acid), NTA (nitrilotriacetic acid), DCTA (diamino-1-2 cyclohexane tetraacetic acid), DPTA (diethylenetriamine pentaacetic acid), IDA (imonodiacetic acid).

The catalytic solution can be an organic solution, as described for example in patent U.S. Pat. No. 5,698,172, consisting (i) of a solvent selected from the following products: N-methyl pyrrolidine, N-formylmorpholine, morpholine, dimethylsulfoxide, sulfolane, dimethylformamide, propylene carbonate, 1,4-dioxane, 4-hydroxy-4-methyl-2-pentanone, propylene glycol methyl ether, 2-butoxyethanol, 4-methyl-2-pentanone, 2,4-pentanedione, alone or in admixture, and (ii) of a chelated polyvalent metal of formula $ML_3$ where L is of $R_1COCH_2COR_2$ form with $R_1$ and $R_2$ selected from groups $CH_3$, $C_2H_5$, $C_6H_5CF_3$, $C_4H_3S$, and M is a polyvalent metal existing in at least two oxidation states.

The examples given hereafter illustrate several variants of the process according to the invention.

EXAMPLE 1

(FIG. 1):

A gas containing methane, 5% $CO_2$, 5000 ppm by volume of $H_2S$ and 30 ppm by volume of $CH_3SH$ is fed through line 5 into an absorber, a static mixer 1 for example. Inside static mixer 1, it is contacted with an aqueous catalytic solution containing iron in a proportion of 0.05 mol/l and nitrilotriacetic acid (NTA) as the complexing agent in a proportion of 0.11 mol/l, through line 6.

The gas is introduced at a flow rate of the order of 10,000 $Nm^3/h$ and the aqueous catalytic solution at a flow rate of about 200 $m^3/h$.

After this oxidation reduction stage according to reaction (1), a cleaned gas containing 10 ppm by volume of $H_2S$ and 15 ppm by volume of $CH_3SH$ is recovered through line 7 and a partly reduced aqueous catalytic solution containing solid elementary sulfur at a concentration of about 0.36 g/l is recovered through line 8.

The pressure inside the absorber can advantageously range between 0.1 and 20 MPa in relative pressure; it is for example 8 MPa. The temperature ranges for example between 10 and 40° C., it is preferably substantially equal to the ambient temperature.

The elementary sulfuir is separated from the reduced aqueous catalytic solution in filter 2 at a pressure substantially equal to 8 MPa. The quantity of sulfur recovered is about 71 kg/hour.

At the filter outlet, the reduced aqueous catalytic solution is at a pressure close to 7.6 MPa.

The aqueous catalytic solution freed from the solid sulfuir and expanded is sent to a flash stage where the dissolved gases are eliminated, mainly the light hydrocarbons, $CO_2$ and sulfur-containing organic products which are discharged through line 13. The gas recovered through line 13 comprises 42% methane, 3% water, 300 ppm by volume of $CH_3SH$ and 55% $CO_2$. After the flash stage, the solution is at a pressure of at least 0.4 MPa.

The reduced degassed aqueous solution discharged through line 14 is sent to the air regeneration stage which is for example carried out by means of three parallel hydroejectors 16 (HYDRODYN 38 hydroejector from, Biotrade, Toulouse, France) which allow suction of 750 $Nm^3/h$ of air. The underpressure required for natural entrainment of the air through line 15 is obtained by contraction of the liquid stream consisting of the catalytic solution. The gas-liquid contact surface thus obtained is very large, which leads to a very high air regeneration rate of the catalytic solution, i.e. a very high rate of oxidation of the ferrous ions of the reduced catalytic solution to ferric ions. The regenerated catalytic solution is thereafter passed through pump 21 wherein the pressure of the solution is raised from the atmospheric pressure to a pressure of 8 MPa, and recycled to absorber 1.

EXAMPLE 2

(FIG. 2):

A gas containing methane, 3% by volume of $CO_2$, 50 ppm by volume of $H_2S$ and 10 ppm by volume of $CH_3SH$ is fed into the absorber, a static mixer for example, through line 5 with a flow rate of the order of 5000 $Nm^3/h$.

It is contacted with an aqueous catalytic solution containing iron at a concentration of 0.25 mol/l and NTA at a concentration of 0.5 mol/l, the flow rate of the solution being 7 $m^3/h$.

As in example 1, a cleaned gas containing 2 ppm by volume of $H_2S$ and 5 ppm by volume of $CH_3SH$, and a partly reduced catalytic solution containing solid elementary sulfur at a concentration of about $5.1 \cdot 10^{-2}$ g/l are recovered.

The pressure and temperature conditions are for example equal to those given in example 1.

About 357 g/h of sufur are recovered at the outlet of filtering device 2.

The partly reduced catalytic solution practically free from solid sulfur is separated into two fractions:

a major fraction $F_1$, about 6 $m^3/h$, which is sent back to contacting enclosure 1 without being expanded through expansion valve 11, a minor fraction $F_2$, about 1.5 $m^3/h$, which is expanded through valve 11 to a pressure substantially equal to 0.3 MPa in relative pressure, and which is sent to regeneration stage 4 by means of two ejectors allowing suction of 7 $m^3/h$ of air required for oxidation of the solution.

It is possible to control fractions $F_1$ and $F_2$ after measuring the potential of the catalytic solution after the filtration stage in order to maintain the $Fe^{3+}/Fe^{2+}$ ratio substantially equal to 20.

The gas recovered after the flash stage contains about 35% by volume of $CO_2$, 100 ppm by volume of $CH_3SH$, 62% methane and 3% water.

Fraction $F_2$ of the regenerated catalytic solution can be recycled to the absorber as in the example of FIG. 1.

EXAMPLE 3

(FIG. 3):

The temperature, gas and catalytic solution injection rate conditions are the same as those mentioned in one of the two examples above. The results relative to the quantities recovered also apply. However, the pressure of the gas to be processed ranges here between 0.1 and 0.5 MPa, preferably between 0.2 and 0.5 MPa, which allows the reduced catalytic solution freed from the solid sulfur to be directly sent to regeneration zone 4 without passing through an expansion valve and a flash drum.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French application 99/07.360, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for desulfurization of a gaseous feed containing at least hydrogen sulfide, comprising at least the following stages:

a) contacting the gaseous feed comprising hydrogen sulfide, in an absorption stage, with a catalytic solution comprising at least one polyvalent metal chelated. by at least one chelating agent, under suitable conditions for oxidation of the hydrogen sulfide to elementary sulfur and concomitant reduction of the chelated polyvalent metal from a higher oxidation level to a lower oxidation level, and recovering (1) a gaseous effluent substantially freed from hydrogen sulfide and (2) a catalytic solution at least partly reduced and containing elementary sulfur, b) separating the solid elementary sulfur from the reduced catalytic solution, c) regenerating the reduced catalytic solution in a regeneration zone, c1) separating oxygen-containing excess gas from the catalytic solution in the regeneration zone, and d) recycling at least part of the regenerated catalytic solution to a stage of contacting the regenerated solution with a gaseous feed comprising, hydrogen sulfide, characterized in that at least part of the reduced catalytic solution freed from most of the elementary sulfur and coming from stage b) is expanded and the gases produced upon expansion are discharged; and in stage c) the resultant expanded reduced catalytic solution is regenerated by contacting the resultant expanded reduced catalytic solution with a gas containing oxygen by means of at least one ejector in said regeneration zone.

2. A process as claimed in claim 1, further comprising fractionating said reduced catalytic solution depleted in elementary sulfur from stage b) into a major fraction $F_1$ and a minor fraction $F_2$, and recycling major fraction $F_1$, to absorption stage a).

3. A process as claimed in claim 2, further comprising measuring the potential of the partly reduced catalytic solution prior to the fractionation stage and controlling, the quantity of said fractions in order to maintain the ratio of the ferric ions to the ferrous ions substantially equal to 20.

4. A process as claimed in claim 1, wherein separation stage b) is carried out at a pressure ranging between 0.1 and 20 MPa.

5. A process as claimed in claim 1, further comprising conducting a gas/liquid separation stage after regeneration of the catalytic solution.

6. A process as claimed in claim 5, wherein the gas/liquid separation stage is conduted in a gas/liquid separation drum for separating oxygen-containing excess gas from the catalytic solution.

7. A process according to claim 6, wherein the ejector is at least partially outside of the gas-liquid separation drum.

8. A process according to claim 6, wherein the reduced catalytic solution is expanded to a pressure P1 of 0.05 to 0.9 MPa after separating the solid elementary sulfur from the reduced catalytic solution to allow autonomous operation of the at least one ejector.

9. A process according to claim 8, wherein the ejector produces a dispersion of bubbles in the reduced catalytic solution.

10. A process as claimed in claim 7, wherein an aqueous solution is used as the catalytic solution for stage a).

11. A process as claimed in claim 10, wherein the catalytic solution is a chelated polyvalent metal solution.

12. A process as claimed in claim 11, wherein the chelating agents are used alone or in admixture and are organic complexing agents.

13. A process as claimed in claim 1, wherein the catalytic solution is an organic solution.

14. A process as claimed in claim 1, wherein the sulfur from separation stage b) is washed with water in order to recover the catalytic solution.

15. A process according to claim 1, wherein the gaseous feed is natural gas.

16. A process according to claim 1, wherein said gases produced upon expansion are recovered for use as a fuel gas.

17. A process according to claim 1, further comprising recycling at least a portion of said oxygen-containing excess gas from the regeneration zone to said gas containing oxygen to avoid pollution to an atmosphere.

18. A process for desulfurization of a gaseous feed containing at least hydrogen sulfide, comprising at least the following stages:

a) contacting the gaseous feed comprising hydrogen sulfide, in an absorption stage, with a catalytic solution containing at least one polyvalent metal chelated by at least one chelating agent, under suitable conditions for oxidation of the hydrogen sulfide to elementary sulfur and concomitant reduction of the chelated polyvalent metal from a higher oxidation level to a lower oxidation level, and recovering (1) a gaseous effluent substantially freed from hydrogen sulfide and (2) a catalytic solution at least partly reduced and containing elementary, sulfur, b) separating the solid elementary sulfur from the reduced catalytic solution, b1) expanding at least one part of the reduced catalytic solution freed from most of the elementary sulfur, then degassing and discharging the resulting gas;

c) regenerating the expanded and degassed reduced catalytic solution from b1) in a regeneration zone by contacting the expanded and degassed reduced catalytic solution with a gas containing oxygen, c1) separating oxygen-containing excess gas from the catalytic solution in the regeneration zone, and d) recycling at least part of the regenerated catalytic solution to a stage of contacting I the regenerated solution with a gaseous feed comprising hydrogen sulfide, wherein the at least part of the reduced catalytic solution freed from most of the elementary sulfur coming from stage b) is partially expanded at stage b1) to a pressure P1 of 0.05 to 0.9 MPa and the resultant partially expanded reduced catalytic solution is fed to at least one ejector in the regeneration zone, where mixing of a gas containing oxygen and the reduced catalytic solution produces the regenerated catalytic solution, and the pressure P1 allows autonomous operation of the at least one ejector.

19. A process according to claim 18, wherein the pressure is 0.1 to 0.5 MPa.

20. A process for desulfurization of a gaseous feed comprising at least hydrogen sulfide, comprising:

separating oxygen-containing excess gas in a regeneration zone from at least a partly reduced catalytic solution, previously contacted with a gaseous feed comprising hydrogen sulfide, and which has been discharged from an ejector which mixed the partly reduced catalytic solution with an oxygen-containing gas.

* * * * *

UNITED STATES PATENT AND TRADEMARK OFFICE
CERTIFICATE OF CORRECTION

PATENT NO. : 6,596,253 B1
DATED : July 22, 2003
INVENTOR(S) : Cécile Barrere-Tricca et al.

It is certified that error appears in the above-identified patent and that said Letters Patent is hereby corrected as shown below:

Column 11,
Line 33, "chelated. by" should read -- chelated by --.
Line 51, "comprising, hydrogen" should read -- comprising hydrogen --.

Column 12,
Line 11, "gas/liquid separation drum" should read -- gas-liquid separation drum --.
Line 24, "according to claim 7," should read -- according to claim 1, --.
Line 57, "elementary, sulfur," should read -- elementary sulfur, --.

Column 13,
Line 4, "contacting I the" should read -- contacting the --.

Signed and Sealed this

Fifth Day of April, 2005

JON W. DUDAS
*Director of the United States Patent and Trademark Office*